United States Patent Office 3,701,828
Patented Oct. 31, 1972

3,701,828
HYDROTHERMAL SYNTHESIS OF PEROVSKITE COMPOSED OF CaO·TiO₂
Robert Ian Harker, Bala Cynwyd, Pa., assignor to Johns-Manville Corporation, New York, N.Y.
No Drawing. Filed Feb. 3, 1971, Ser. No. 112,423
Int. Cl. C01g 23/00; C01f 11/00
U.S. Cl. 423—598                            5 Claims

ABSTRACT OF THE DISCLOSURE

Hydrothermal method of synthesizing the mineral perovskite from lime and titania, and the product thereof exhibiting unique pigment and radiation opacifying characteristics.

BACKGROUND OF THE INVENTION

The stability of pigment materials, especially insofar as index of refraction, exact color and brightness maintenance, and the like properties affecting their function in this category, within all environmental conditions encountered under their contemplated use, constitutes an essential requirement in their continued designed performance as a pigment. Many white pigments are either unsuitable for specific applications wherein a low bulk density is required, or else they degrade upon continued exposure to the conditions encountered in use. Stability is particularly important, for example, in thermal control coatings wherein protected systems are designed to operate within narrow temperature limits which are dependent for stability upon the absorptance and emissivity of the coating which is controlled by the pigment. Even such an extensively employed and highly effective pigment material as titania ($TiO_2$), which under ordinary temperature and atmospheric conditions is quite stable or substantially resistant to change, is susceptible to definite degradation at elevated temperatures and/or upon encountering certain ambient conditions other than ordinary atmospheric, whereupon its white color and brightness may be darkened and diminished, or in other words its pigment hiding capacity and the like essential pigment functioning properties are impaired. For instance, it is known that at 600 to 900° C., reducing gasses such as hydrogen and carbon monoxide, etc., attack titanium dioxide forming reduced oxides such as $Ti_3O_5$ which is bluish black or TiO which is light bronze. In either case the pigment powers of the titanium dioxide would be destroyed following any significant amount of reduction and, in turn, color degradation.

High temperatures and/or chemical attack among other possibly occurring degrading influences such as radiation, which modifies the property of most white pigments including compounds of barium, lead, titanium, zinc, zirconia, and the like, and in particular diminishing their good white and bright color or physico-chemical conditions and refractive indices, destroys their usefulness as pigments in certain applications such as in the aerospace field or in other particularly demanding areas.

SUMMARY OF THE INVENTION

This invention comprises a new and practical method of synthesizing mineral perovskite in a distinctive form providing advantageous pigment properties, among numerous other useful and beneficial characteristics, in which form it is uniquely stable under a variety of aggressive conditions, including in particular high temperature environments and exposure to various electromagnetic and particulate radiation, whereby it maintains its attributes rendering it adaptable as a white pigment or thermal radiation opacifying material, and in particular its whiteness and brightness of color and high index of refraction. Specifically the invention embodies the formation of mineral perovskite in a distinctive and useful form by means of a hydrothermal reaction which can be carried out at relatively moderate and thus practical conditions insofar as steam temperatures and pressures, and utilizing therein reactants from generally common and economical sources.

The product of the hydrothermal method of this invention possesses many useful and distinctive attributes rendering it especially adaptable and beneficial in the field of pigments and opacifiers, comprising a good white and bright color, fine crystalline particle construction, a bulky particle configuration of low weight, very high refractive index of about 2.38 with good hiding power, and good physical and chemical stability under very high temperatures, and assorted aggressive conditions thereby preserving the properties rendering it a desirable pigment.

It is the primary objective of this invention to provide a new and economical method and improved means of producing mineral perovskite, and further of hydrothermally synthesizing perovskite in a form having distinct and unique attributes for its utility as a white pigment and/or opacifying agent, especially good quality of whiteness, very high index of refraction, low bulk density, suitable particle configuration or fine grain unit, and good thermal and chemical stability insofar as maintaining these attributes rendering it an apt pigment, such as whiteness.

DESCRIPTION OF THE PREFERRED EMBODIMENT

This invention primarily constitutes a new and advantageous method of synthesizing mineral perovskite from the oxides of its basic constituents consisting of CaO and $TiO_2$ by means of a hydrothermally induced reaction therebetween carried out at substantially moderate superatmospheric steam pressures and temperatures.

Hydrothermal reaction conditions which may be utilized in the practice of this invention commence with temperatures of approximately 175° C. and pressures of about 115 p.s.i. applied over periods of time of from about 2 hours or greater with generally no upper time limitations due to the product's relatively good thermal stability. Generally, the time and temperature conditions of the hydrothermal reactions are to a substantial degree inversely proportional, with high temperatures somewhat accelerating the reaction, as is to be expected. Also extraneous factors may influence the time and/or temperature of the hydrothermal reaction such as the reaction solution concentrations, impurities entrained, physical agitation, or presence in the medium of reaction inciting mineralizers or catalyst-like agents. These conditions under some circumstances have been found to exert a discernible, if not significant, influence upon the hydrothermal temperature and pressure required such as which temperatures and pressures are operable or effective within the aforegiven range and the time duration required.

Preferred temperatures and periods of time therefor in the hydrothermal reaction, in that they are applicable in the effective synthesis of the distinctive perovskite product of this invention and commercially practical or feasible, comprise temperatures from about 200° C. up to about 600° C., although higher temperature conditions can be employed. With such temperatures a good quality perovskite product can be produced rapidly within periods of about 4 to 12 hours.

Aside from the temperature and the proclivity of the ingredients to react, the rate of the hydrothermal reaction and formation of perovskite can be governed and/or accelerated by the use of mineralizers which exert a catalyst-like influence upon the reaction in increasing the rate of formation without modifying the product. Apt mineralizers comprise highly water soluble agents such as the alkali metal salts, e.g., sodium and potassium compounds including sodium fluoride and sodium chloride or their potassium counterparts. Their presence, depending upon the desired reaction speed, may vary considerably in amount with between 1 or 2 to 10% by weight thereof, based upon the total solids, being typical.

The active ingredients suitable for reactants in the hydrothermal formation of perovskite comprise substantially any active source of the required oxides of calcium and titanium, or their respective hydrates. Simply lime, or more appropriately hydrated lime or calcium hydroxide for well known practical reasons, constitutes the most feasible commercial material to provide this agent. Titanium dioxide is preferably employed in the form of the hydrate $TiO_2 \cdot nH_2O$ or its dehydration products, because of their generally more reactive nature in relation to certain of the crystal and polymorphic types of titania. This hydrate can be obtained as an intermediate in the formation of $TiO_2$ by the hydration of basic titanium sulfate or titanium tetrachloride. Other sources of the dioxide of titanium for the practice of the hydrothermal method of this invention may include the more slowly reactive crystallized forms of $TiO_2$ comprising each of the three polymorphic types of brookite, anatase, and rutile.

The relative proportions of these materials should be such as to provide the calcium and titanium oxides in a stoichiometric mole ratio by weight of one mole of CaO to one mole of $TiO_2$. Substantial departures from the given mole ratios introduce contaminating or alien com positions accompanying the perovskite product, and which are frequently detrimental to its formation and/or resulting product. For instance, the presence of silica in a form reactive under the particular hydrothermal conditions, may result in the formation of the mineral sphene ($CaO \cdot TiO_2 \cdot SiO_2$) in addition to or in place of perovskite, especially if the hydrothermal conditions of the reaction are extended.

The hydrothermal reaction is preferably carried out with the reactants dispersed in water to permit mobility and facilitate contact and in turn expedite their reaction, with typically preferred ratios of one part by weight of solids to between about 10 and 100 parts by weight of water. Within the given practical temperature conditions of about 200° C. up to about 600° C., the reaction will thus take place within an environment of water or dilute mineralizer solution at pressures equal to or somewhat greater than those of the saturated vapor in the range from 200° C. up to the critical temperature of the fluid and at pressures of at least about 115 p.s.i. at temperatures above the critical temperature up to about 600° C. However, where the reaction is otherwise carried out in the atmosphere of water vapor, it is not essential to disperse the ingredients in a water medium.

The following illustrate diverse conditions and reaction ingredients and the products comprising perovskite derived therefrom of this invention and illustrate various means of practicing the invention.

The given exemplary hydrothermal syntheses of Examples I, II and III were carried out in 70 cc. reaction vessels without agitation, and Examples IV, V and VI carried out in a Blaw Knox, two-gallon capacity autoclave with a rotary stirrer. The reactants were dispersed in water as a reaction medium in a concentration of one part by weight of solids to approximately 20 parts by weight of water. The amounts of starting materials were proportioned, by weight, to provide mole ratios of 1 CaO to 1 $TiO_2$, except in Example I wherein the ratio was 2 CaO to 1 $TiO_2$.

| Example No. | Starting materials | Temperature, °C. | Pressure, p.s.i. | Time/ hrs. | Products identified by X-ray diffraction |
|---|---|---|---|---|---|
| I | 2 Ca(OH)$_2$ plus anatase (TiO$_2$) plus SiO$_2$ n H$_2$O | 200 | 211 | 638 | Perovskite plus anatase. |
| II | Ca(OH)$_2$ plus anatase (TiO$_2$) | 320 | 1,615 | 673 | Do. |
| III | Ca(OH)$_2$ plus TiO$_2$ n H$_2$O plus 2% NaF | 305 | 1,322 | 744 | Perovskite. |
| IV | Ca(OH)$_2$ plus TiO$_2$ n H$_2$O | 457 | 440 | 4 | Do. |
| V | Ca(OH)$_2$ plus TiO$_2$ n H$_2$O | 457 | 440 | 8 | Do. |
| VI | Ca(OH)$_2$ plus TiO$_2$ n H$_2$O | 457 | 440 | 12 | Do. |

The product of each of the foregoing examples was identified by X-ray powder diffraction whereupon the products produced the distinctive diffraction pattern substantially that of natural perovskite. The products exhibited an index of refraction of about 2.38, and a specific gravity of 4.0.

What I claim is:

1. A method of synthesizing a product consisting of mineral perovskite composed of $CaO \cdot TiO_2$ consisting essentially of reacting under hydrothermal conditions the oxides of calcium and titanium in a mole ratio by weight of approximately 1 mole of CaO to 1 mole of $TiO_2$ within an atmosphere of substantially saturated water vapor at a pressure at least about 115 p.s.i. and a temperature of 175° C. to 600° C. for a period of approximately 2 to 12 hours.

2. The method of claim 1 wherein the given hydrothermal conditions are carried out for a period of about 4 to 12 hours.

3. The method of claim 1 wherein the given hydrothermal conditions are carried out for a period of about 8 hours.

4. The method of claim 1 wherein a mineralizer is employed in the reaction to accelerate the rate therein and is included in amounts thereof up to about 10% by weight of the solid reactants.

5. The method of claim 4 wherein the mineralizer comprises at least one very water soluble alkaline metal salt selected from the group consisting of sodium chloride, potassium chloride, sodium fluoride and potassium fluoride.

References Cited

UNITED STATES PATENTS

| 2,140,236 | 12/1938 | Lederle et al. | 23—51 R |
| 2,166,221 | 7/1939 | Patterson | 23—51 R |
| 2,218,655 | 10/1940 | Peterson | 23—51 R |

HERBERT T. CARTER, Primary Examiner